July 18, 1944.    C. C. DE PEW    2,353,814
TORQUE INDICATOR
Filed March 14, 1942    2 Sheets-Sheet 1

INVENTOR
CHESTER C. DePEW
ATTORNEYS

July 18, 1944.  C. C. DE PEW  2,353,814
TORQUE INDICATOR
Filed March 14, 1942  2 Sheets-Sheet 2
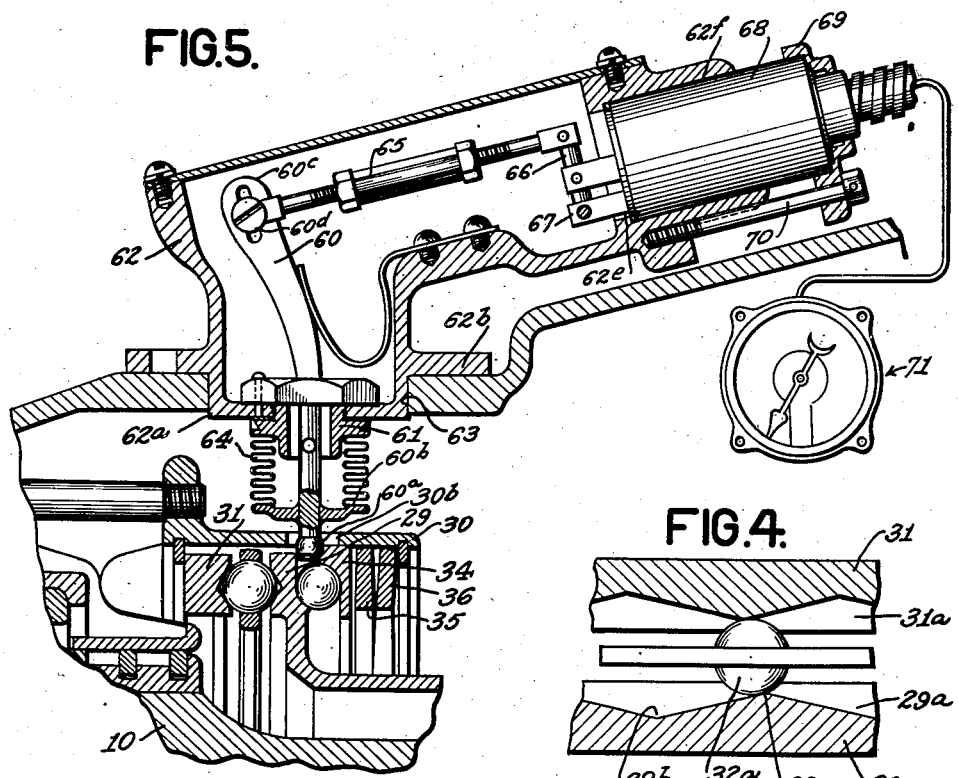
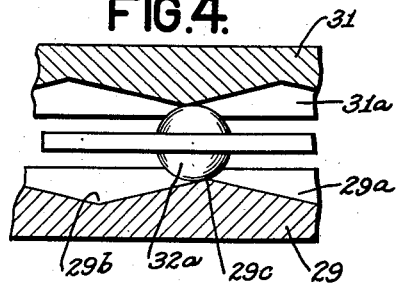
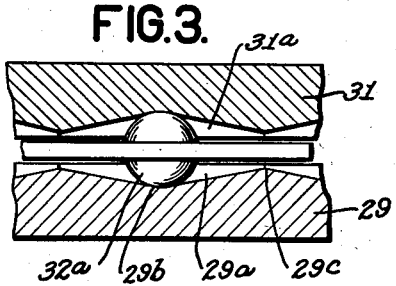
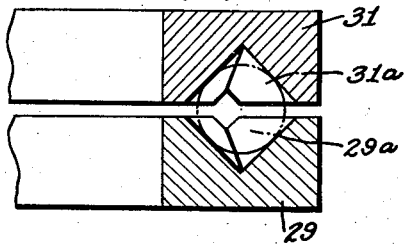
INVENTOR
CHESTER C. DePEW
by Hoguet Neary & Campbell
his ATTORNEYS Patented July 18, 1944

2,353,814

UNITED STATES PATENT OFFICE 2,353,814

TORQUE INDICATOR

Chester C. De Pew, Farmingdale, N. Y., assignor to Fairchild Engine and Airplane Corporation, Farmingdale, N. Y., a corporation of Maryland Application March 14, 1942, Serial No. 434,720

12 Claims. (Cl. 265—25)

This invention relates to torque indicators and relates more particularly to devices for measuring and indicating the torque exerted on power transmitting shafts.

Devices of the type embodying the present invention may include a coupling between a driving and a driven element which permits limited relative movement between the elements in response to variation in torque. The relative movement of the elements may be transmitted by means of suitable connections to an indicating device which is calibrated to indicate torque values.

More particularly, the device may include driving and driven shafts coupled by a planet gear system having a sun gear which is capable of limited resiliently opposed movement in response to variation in the torque exerted on the shafts. Resilient opposition to the movement of the sun gear may be obtained by means of a pair of opposed rings having undulatory grooves of varying width and depth therein for receiving balls so that the rings are moved apart upon relative rotation thereof in response to movement of the sun gear, thereby compressing suitable springs which tend to resist the relative movement of the rings. The relative movement of the rings is used to actuate a torque indicator. The mechanism connecting the indicator to the rings may include a fully hydraulic system or a mechanico-hydraulic system by means of which the movement of the rings may be converted into fluid flow for actuating the indicator.

For a better understanding of the present invention, reference may be had to the accompanying drawings, in which:

Figure 2 is a view in cross-section of the rotatable rings with the ball and ball cage removed in order to show the cross-sectional contour of the undulatory grooves in the rings;

Figure 3 is a view in section taken through the rings illustrating the relationship of the rings when the torque is not exerted on the propeller shaft;

Figure 4 is a view in section showing one position of the rings when the propeller shaft is under torque;

Figure 5 is a view in section of a portion of a modified form of device for transmitting torque measurements to an indicator.

Torque measuring and indicating devices of the type embodying the present invention will be described hereinafter with relation to their application to an inverted type of internal combustion engine, but it will be understood that the torque indicator is equally applicable to other types of engines or motors and to any other forms of devices for supplying and/or transmitting power, such as, for example, gear boxes, power transmission shafts and the like.

Figure 1:
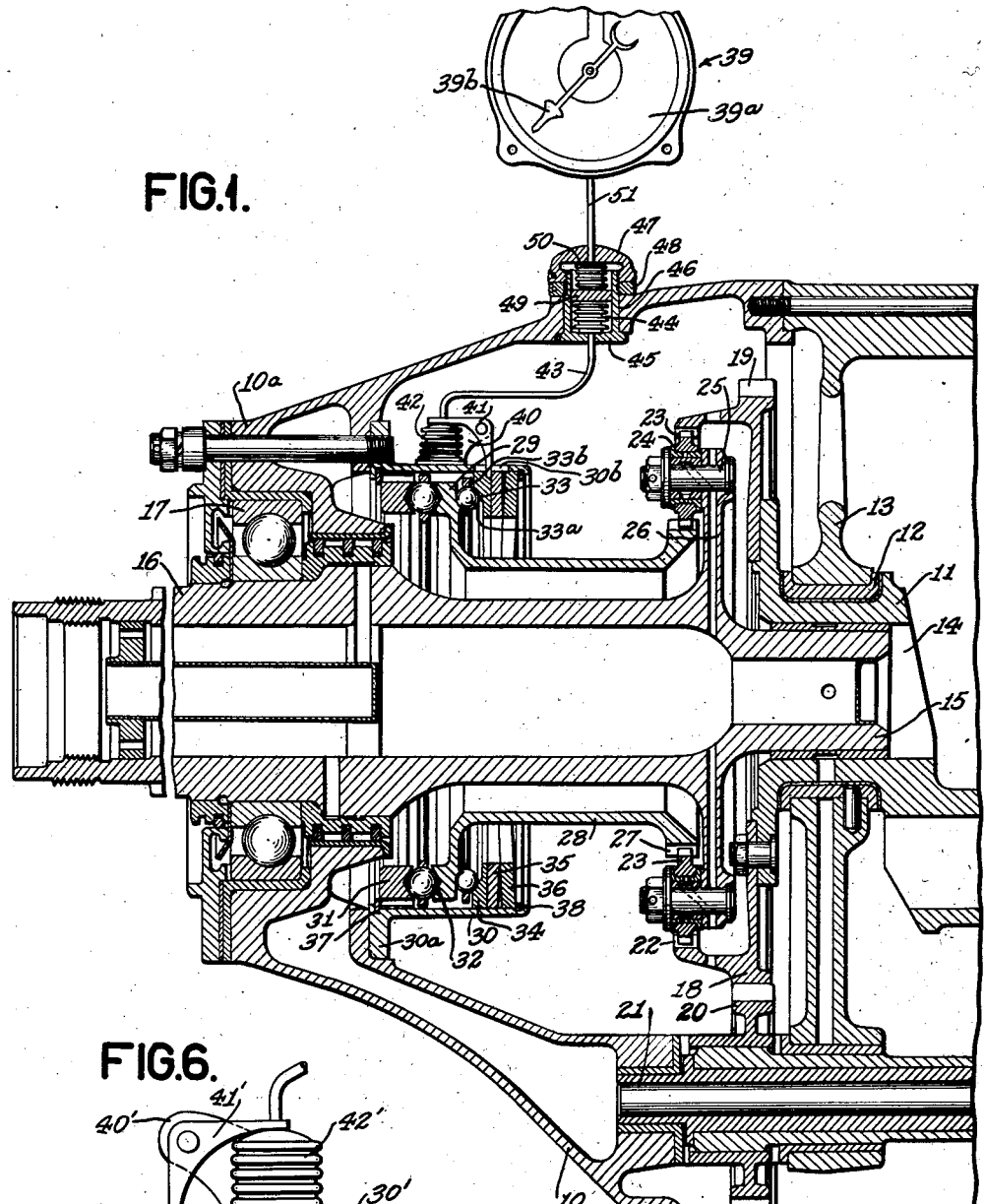
Figure 1 is a view in section taken through a portion of an internal combustion engine provided with one form of torque measuring and indicating device embodying the present invention.

As illustrated in Figure 1 of the drawings, the internal combustion engine may include a crankcase 10 of suitable size and shape from which depend the cylinders of the engine (not shown). Within the crankcase is mounted a crankshaft 11 which is rotatably mounted in suitable bearings, one of which, 12, is disclosed as mounted in a partition 13 extending transversely of the crankcase. It will be understood that the crankcase may be provided with other suitably supported bearings for receiving the crankshaft. The crankshaft 11 is provided with an axial bore 14 in its left hand end, as viewed in Figure 1, for receiving the end 15 of a propeller shaft 16 which is suitably supported in an anti-friction bearing 17 in a reduced end 10a of the crankcase 10. The propeller shaft 16 thus is not directly connected to the crankshaft 11, but is coaxial therewith and is driven by the crankshaft in a manner now to be described.

The crankshaft 11 is provided at its end with a drum 18 having a ring gear 19 which, as illustrated, meshes with a gear 20 that is secured to and drives the cam shaft 21. The drum 18 is provided also with an internal gear 22 which meshes with a series of planet gears 23, each rotatably supported on a suitable bearing 24 which is mounted on a stub-shaft 25. Each of the stub-shafts 25 is secured to a plate or spider 26 that is rigidly connected to the propeller shaft 16 and rotates therewith.

The planet gears 23 mesh with the sun gear 27 which is fixed to a sleeve 28 that is concentric with the propeller shaft 16 and spaced therefrom. The left hand end of the sleeve 28 is provided with a ring member 29.

Mounted within the crankcase 10, adjacent its reduced end portion 10a, is a cylindrical drum 30 having a radially extending flange 30a thereon which is secured to the inside of the crankcase 10a. Within the drum 30 are mounted an annular ring 31, and the ring 29 with an antifriction bearing 32 therebetween. A second antifriction bearing 33 including balls 33a and a cage 33b, is interposed between the ring 29 and a ring 34. The opposed surfaces of the rings 29 and 34 are suitably curved to form ball races. A pair of dished spring rings 35 and 36 bear against the ring 34 and preferably are of the type generally known as "Belleville" springs. The ring 31 is splined to the interior of the drum 30 and is retained against endwise movement to the left by means of a snap ring 37 engaging in a groove in the drum 30. A snap ring 38 at the opposite end of the drum 30 which engages the spring ring 36 retains all of the other elements in the drum 30.

The bearing 33, the bearing ring 34, the springs 35 and 36, and the snap ring 37 are of larger internal diameter than the diameter of the gear 27 in order to permit easy assembly by slipping the gear 27 through the other elements.

As shown in Figures 2, 3 and 4, the rings 29 and 31 are provided with the grooves 29a and 31a for receiving the balls 32a of the bearing 32. The grooves 29a and 31a are mirror images of each other and, therefore, only one of the grooves will be described. As illustrated particularly in Figure 2, the groove 29a is of undulatory shape of varying width and depth so as to form cam surfaces. The groove 29a is of angular cross-sectional shape tapering from a zone 29b of greatest depth and width to another zone 29c of materially smaller depth and width, but of a similar cross-sectional shape.

The rings 29 and 31 will normally be urged by the springs 35 and 36 into such positions that the balls 32a will be disposed in the widest and deepest portion of the grooves 29a and 31a, as shown in Figure 3. Upon relative rotation of the rings 29 and 31, the balls will roll toward the narrowest and shallowest portions of the grooves, forcing the rings 29 and 31 apart and flattening the rings 35 and 36.

In operation, the crankshaft 11 will rotate the internal gear 22 which causes the planet gears 23 to rotate on the periphery of the sun gear 27, thereby also rotating the propeller shaft 16. The pressure of the springs 35 and 36 normally tends to retain the rings 29 and 31 in the positions shown in Figure 3, and thus resists rotation of the sun gear 27. However, when rotation of the propeller shaft 16 is resisted, the reaction of the planet gears 23 against the sun gear 27 will tend to rotate the sun gear 27 and the ring 29. Rotation of the ring 29 and consequent displacement of the ring 29 to the right will be resisted by the springs 35 and 36. By regulating the resiliency and thickness of the springs 35 and 36, the lateral displacement of the ring 29 and resistance to displacement can be controlled within close and accurate limits, so that the displacement is proportional to the torque exerted on the shaft 16. It will be understood that the springs 35 and 36 will limit rotation of the ring 29 and prevent the balls 32a from moving beyond the narrow zone 29c of the grooves 29a into the next adjacent wider portion 29b of the grooves.

Movement of the ring 29 may be utilized to control an indicator 39 of the fluid actuated type which is provided with a scale 39a calibrated in torque values and having a cooperating pointer 39b. In order to actuate the indicator 39, the drum 30 is provided with a U-shaped bracket 40 which receives a bellcrank lever 41 having one end extending through a slot 30b in the drum 30 and engaging between the ring 34 and the spring 35 so that the bellcrank lever 41 will be rocked in response to axial movement of the ring 29. The other end of the bellcrank lever 41 engages a liquid filled "Sylphon" bellows 42 which is mounted in the bracket 40 and compresses or releases the bellows 42. The bellows 42 is connected by means of a conduit 43 to a second bellows 44 which is mounted in cylinder 45 which is disposed in liquid-tight engagement in an aperture 46 in the top of the crankcase 10. The outer end of the member 45 is sealed by means of a cap 47 which is threaded on the cylinder 45. The cylinder is locked in the aperture 46 of the crankcase by means of a nut 48 which is threaded on the cylinder 45 and is secured tightly against the outside of the crankcase. The cylinder 45 also has a piston 49 therein and a second liquid-filled "Sylphon" bellows 50, the piston 49 being interposed between the bellows 44 and 50 to cause compression of the bellows 50 upon expansion of the bellows 44 and expansion of the bellows 50 upon contraction of the bellows 44. The bellows 50 is connected by means of a conduit 51 to the indicator 39 and thus the pointer 39b of the indicator is responsive to expansion and contraction of the bellows 42.

Figure 6:
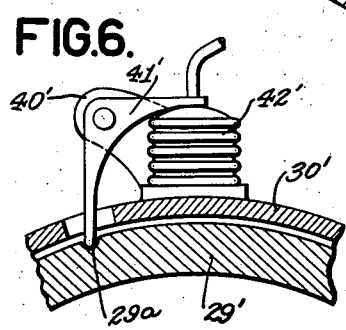
Figure 6 is a view partly in section and partly broken away of a modified form of connection between the rotatable rings and the hydraulic transmission for actuating the indicator.

While the torque indicator is disclosed as being responsive to axial movement of the ring 29, it will be understood that the bellcrank 41 may be arranged to be responsive to rotary movement of the ring 29. As shown in Figure 6, the bellcrank 41' engages in a notch or recess 29a in the periphery of the ring 29' so that the bellcrank is rocked by rotary movement of the ring 29' rather than axial movement thereof. The bracket 40', the "Sylphon" bellows 42', the drum 30' and ring 29' are otherwise similar to the corresponding elements disclosed in Figure 1.

A modified form of mechanism is disclosed in Figure 5 for translating movement of the ring 29 into movement of the indicator pointer. This mechanism includes a lever 60 having a ball-like lower end 60a interposed between the ring 34 and the ring 29 through the slot 30b in the drum 30. The lever 60 is pivotally supported in a collar 61 which is mounted on a housing 62. The housing includes a cylindrical portion 62a which extends through an opening 63 in the crankcase 10. A flange 62b is provided for securing the housing 62 to the crankcase 10 in liquid-tight relationship. In order to prevent oil leakage into the housing 62, the lever 60 is provided with a disc member 60b to which is secured a flexible liquid-tight bellows 64 having its other end secured to the collar 61 in liquid-tight relation. The opposite end 60c of the lever 60 extends into the housing 62 and is connected to a turnbuckle link 65 by means of a pin and slot connection 60d. The link 65 is connected to a lever 66 which is pivotally connected to a lug 67 on a cylinder 68 which is secured in an opening 62f in the casing 62. A cap 69 engages the cylinder 68 and retains it in engagement with a shoulder 62e within the opening 62f in the casing 62. Stud bolts 70 are provided for drawing the cap 69 against the right hand end of the cylinder 68. The cylinder 68 is provided with a pair of "Sylphon" bellows, not shown, forming a part of a hydraulic power transmission system and is a known type of device for compensating for ambient temperature changes.

The operation of the system described above is similar to that disclosed in Figure 1 inasmuch as rocking motion of the lever 60 in response to lateral displacement of the ring 29 is converted into fluid flow for actuating the indicator 71.

From the preceding description it will be apparent that the torque measuring and indicating mechanism embodying the present invention can be incorporated readily into internal combustion engines and other power transmitting devices so that these elements of the mechanism may be properly lubricated and protected.

While the preferred forms of the invention are described above, it will be understood that the mechanism is susceptible to considerable modification, for example, the shape of the grooves in the cooperating rings 29 and 31 may be varied, either of the rings 29 and 31 can be arranged to shift axially in response to movement of the sun gear, one or more or different types of displacement resisting springs may be used and the bearings and supports for the rings and other cooperating elements may be modified considerably. Therefore, the forms of the inventions described above should be considered as illustrative only and not as limiting the scope of the following claims.

I claim:

1. In a device for measuring torque, the combination of a driving member and a driven member, a planetary gear system coupling said driving and driven members, said system having a sun gear axially movable and rotatable relatively to said driving and driven members, cam means including a fixed member and a ring member having opposed cam faces, said ring member being connected to and coaxial with said sun gear for shifting said sun gear axially in response to rotation thereof and spring means resiliently opposing axial movement of said sun gear to render axial movement of said sun gear proportional to the torque exerted on said driving and driven members.

2. In a device for measuring torque, the combination of a driving member and a driven member, a planetary gear system coupling said driving and driven members, said system having a sun gear rotatable relatively to said driving and driven members, a sleeve shaft rigidly connected to said sun gear and coaxial with one of said members, cam means on said sleeve shaft, non-rotatable cam means cooperating with the first-mentioned cam means and operable to cause relative axial movement of said sleeve and said non-rotatable cam means in one direction upon rotation of said sun gear, anti-friction means interposed between said first-mentioned and said non-rotatable cam means and spring means resiliently opposing said relative axial movement in said one direction to render said axial movement proportional to the torque exerted on said driving and driven members.

3. In a device for measuring torque, the combination of a driving member and a driven member, a planetary gear system coupling said driving and driven members, said system comprising an internal gear fixed to one of said members, planet gears rotatably mounted on the other member and a movable sun gear, a first axially facing cam member connected to said sun gear for rotation therewith, a second cam member opposing said first cam member, anti-friction means interposed between said cam members to cause relative axial movement of said cam members in response to rotation of said sun gear, and spring means resiliently opposing said relative axial movement of said cam members.

4. In a device for measuring torque, the combination of a driving member and a driven member, a planetary gear system coupling said driving and driven members, said system comprising an internal gear fixed to one of said members, planet gears rotatably mounted on the other member and a sun gear rotatable relatively to said members, a first cam member connected to said sun gear for rotation therewith, a second fixed cam member cooperating with the first cam member, said cam members having opposed cam surfaces, anti-friction means interposed between said cam members for displacing said first cam member axially in response to rotation of said sun gear, means for resiliently resisting axial displacement of said first cam member and rotation of said sun gear, and anti-friction means interposed between said resilient means and said first cam member.

5. In a device for measuring torque, the combination of a driving member and a driven member, a planetary gear system coupling said driving and driven members, said system comprising an internal gear fixed to one of said members, planet gears rotatably mounted on the other member and a sun gear rotatable relatively to said members, a first ring-member connected to said sun gear, a second ring-member coaxial with the first ring-member, said ring-members having undulatory cam grooves of varying width and depth in their opposed surfaces, ball members in said grooves for displacing one of said ring-members axially with relation to the other ring-member upon relative rotation of said sun gear, and resilient means opposing axial displacement of said one of said ring-members.

6. In a device for measuring torque, the combination of a driving shaft, a driven shaft, a planetary gear system coupling said driving and driven shafts, said system including an internal gear fixed to one of said shafts, planet gears rotatably mounted on the other shaft and a sun gear, a rotatable sleeve member rigidly connected to said sun gear and having an opposite end portion, a cam member on said end portion, a second cam member facing the first-mentioned cam member, said cam members having undulatory, opposed surface portions, anti-friction means between said surface portions and acting with said cam members upon rotary movement of said sleeve member to cause relative axial movement of said sleeve member and second cam member in one direction, spring means resisting relative movement of said sleeve and second cam members in said one direction, and indicating means responsive to relative movement of the sleeve member and second cam members.

7. In a device for measuring torque, the combination with a driving shaft and a driven propeller shaft, of planetary gearing connecting the same comprising a rotatable and axially movable sleeve shaft coaxial with the propeller shaft having a sun gear and an outwardly extending flange adjacent its opposite ends, an undulatory cam on a radial face of said flange, a cooperating annular undulatory cam facing the first-mentioned undulatory cam for causing axial movement of said sleeve shaft upon rotation of said sun gear, a thrust bearing surrounding said sleeve shaft, anti-friction means interposed between said undulatory cams, spring means acting on said thrust bearing to resist axial movement of said sleeve shaft by said cams, and indicating means responsive to axial movement of the sleeve shaft.

8. A device for measuring torque, comprising a driving shaft, a coaxial driven propeller shaft extending forwardly therefrom, a casing at least partially enclosing said shafts, a planetary gear system connecting the driving and propeller shafts and comprising a rotatable and axially movable sleeve shaft having at one end a sun gear and at its other end a flange, a torque cam member on said flange, a cooperating annular torque cam member in the casing, anti-friction means between said torque cam members for shifting said sleeve shaft axially upon relative rotation of said cam members, an annular anti-friction thrust bearing and an annular spring resisting axial movement of said sleeve shaft in response to rotation of said sleeve shaft, and means for indicating the axial movement of said sleeve shaft.

9. A device for measuring torque, comprising a rotatable driving member, a driven shaft coaxial with said driving member, a casing in which the driving member and driven shaft are rotatably mounted, planetary gearing connecting the driving member and driven shaft comprising an axially movable and rotatable sleeve shaft having a sun gear and an outwardly extending flange adjacent its opposite ends, a torque cam on a radial face of said flange, a ring member fixed in the casing having a torque cam opposed to the first-mentioned torque cam, anti-friction means between and engaging said torque cams, a spring and an annular anti-friction thrust bearing coacting with another face of said flange to resist movement thereof in the direction of said another face, said anti-friction thrust bearing being of a diameter greater than the diameter of the sun gear to facilitate assembly, and means for indicating the extent of relative movement of the sleeve shaft.

10. In drive gearing, the combination of a driving shaft, a driven shaft coaxial therewith, a casing in which said shafts are rotatably mounted, planetary gearing connecting said driving and driven shafts and comprising a sleeve shaft having a sun gear and a radial flange adjacent its opposite ends, a torque cam member on a face of said flange directed away from said sun gear, a cooperating torque cam member fixed in the casing and facing the first-mentioned torque cam member, anti-friction means interposed between said torque cam members, spring means yieldably pressing the cam members against said anti-friction means to inhibit relative rotation, anti-friction means engaging said radial flange and supporting said sleeve for rotation, and indicating means responsive to movement of the flange.

11. A torque measuring device comprising a driving shaft, a driven shaft coaxial therewith, a casing in which said shafts are rotatably mounted, planetary gearing connecting said driving and driven shafts and comprising a sleeve shaft having a sun gear at one end and a radial flange at the other end, forming a torque cam member having an undulatory surface portion, a cooperating torque cam member having an undulatory surface portion fixed in the casing and facing the first-mentioned torque cam member, anti-friction means interposed between said undulatory surface portions, an anti-friction thrust bearing and a spring resisting axial movement of said flange away from the cooperating torque cam and means for indicating the extent of movement of said flange.

12. A torque measuring device comprising a driving shaft, a coaxial driven shaft, a casing in which said shafts are rotatably mounted, planetary gearing connecting said shafts and including a sleeve member slightly larger and coaxial with said driven shaft and having a sun gear and a spaced radial flange thereon, said flange having a torque cam member on one radial face and a bearing surface on its opposite face, an annular torque cam member fixed in the casing cooperating with said first-mentioned torque cam member, anti-friction means interposed between said torque cam members, an annular bearing member, anti-friction means between said bearing surface and said bearing member, an annular spring member engaging said annular bearing member and resisting axial movement thereof, the annular bearing member and spring being of an internal diameter greater than the diameter of the sun gear to permit assembly thereover, and indicating means responsive to movement of the sleeve member.

CHESTER C. DE PEW.